United States Patent [19]

Yang

[11] Patent Number: 4,505,301

[45] Date of Patent: Mar. 19, 1985

[54] LIQUID MIXING VALVE

[76] Inventor: Tai-Her Yang, 5-1 Tay Pyng Street, Shi Hwu Jenn, Jang Huah Shiann, Taiwan

[21] Appl. No.: 356,402

[22] Filed: Mar. 9, 1982

[51] Int. Cl.³ .................... F16K 11/087; F16K 31/02
[52] U.S. Cl. .............................. 137/625.41; 137/636.2; 251/65; 251/137; 251/297; 318/82
[58] Field of Search ...................... 137/625.17, 625.41, 137/636.2, 636.3, 636.4; 251/137, 65, 297, 315; 355/266; 318/82

[56] References Cited

U.S. PATENT DOCUMENTS

| | | | |
|---|---|---|---|
| 1,614,437 | 1/1927 | Cochran | 137/625.41 |
| 2,592,062 | 4/1952 | Perry | 137/625.41 |
| 2,761,079 | 8/1956 | Giertz-Hedstrom et al. | 310/82 |
| 3,167,086 | 1/1965 | Michalski | 137/625.41 |
| 3,422,849 | 1/1969 | Manoogian | 137/625.41 |
| 3,533,436 | 10/1970 | Parkison | 137/636.3 X |
| 3,609,422 | 9/1971 | Nordin | 310/82 |
| 3,792,295 | 2/1974 | Garbi | 310/82 |
| 3,906,999 | 9/1975 | Manoogian et al. | 137/625.41 |
| 4,056,760 | 11/1977 | Frenk | 310/82 |
| 4,226,260 | 10/1980 | Schmitt | 137/625.17 |

FOREIGN PATENT DOCUMENTS 195534  2/1908  Fed. Rep. of Germany ...... 251/137

Primary Examiner—Alan Cohan
Assistant Examiner—John A. Rivell
Attorney, Agent, or Firm—Cushman, Darby & Cushman

[57] ABSTRACT

A mixing valve for mixing a first liquid with a second liquid. A control handle allows an operator to control both the ratio of the two liquids in the mixture and the flow rate of the mixture. A spherical guide body is rotatably disposed within an inside spherical cavity of a valve body. Separate inlet orifices inject a first liquid and a second liquid into the spherical cavity, while a third orifice discharges the mixture from the spherical cavity. A spherical guide body is rotatably disposed within the spherical cavity. A mixing cavity is disposed in the guide body to communicate with the discharge orifice and the two inlet orifices. A handle is connected to the guide body to allow an operator to rotate the guide body. If the guide body is rotated in one direction, the ratio of the area of the first inlet orifice communicating with the mixing cavity to the area of the second inlet orifice communicating with the mixing cavity is varied, changing the composition of the mixture. If the guide body is rotated in another direction at right angles to the first direction, the area of both inlet orifices communicating with the mixing cavity are simultaneously varied, changing the mixture discharge rate. Biasing means are used to offer resistance to changing the mixture composition, but not the mixture discharge rate.

11 Claims, 9 Drawing Figures

LIQUID MIXING VALVE

SUMMARY OF THE INVENTION

The present invention relates to a valve for mixing two liquids together. The invention permits an operator by moving a single handle to control both the ratio of a first liquid to a second liquid in the mixture and the flow rate of the mixture.

A spherical guide body is rotatably disposed in an inside spherical cavity of a valve body. Separate inlet orifices are disposed in the spherical cavity for injecting a first and a second liquid into the spherical cavity, and a discharge orifice is disposed in the spherical cavity for discharging a mixture of the first and second liquids. Disposed in the guide body is a mixing cavity which communicates with the discharge orifice and the inlet orifices. The area of the first inlet orifice and the area of the second inlet orifice which communicate with the mixing cavity are variable by rotating the guide body.

A handle connected to the guide body enables an operator to rotate the guide body. The handle is permitted to move anywhere in a rectangular portion of a plane. Handle movement parallel to one axis of the plane will rotate the guide body to simultaneously vary the areas of the inlet orifices communicating with the mixing cavity, thus varying the discharge rate of the mixture. Handle movement parallel to the other axis of the plane will rotate the guide body to change the ratio of the areas of the inlet orifices communicating with the mixing cavity, thus varying the mixing ratio of one liquid to the other. Motion in a direction having components parallel to each axis will simultaneously vary both the flow rate and the mixing ratio.

The guide body is provided with a substantially annular slot into which a substantially annular seal is fitted. When the handle is adjusted to minimize the flow rate of the mixture, the seal surrounds both inlet orifices to prevent liquid from flowing from the inlet orifices to the discharge orifice.

Grooves disposed in the guide body contact a leaf spring extending from the valve body to offer resistance to guide body rotation in the direction which changes the mixing ratio. Resilient studs are placed between the guide body and the valve body at the poles defined by the axis about which the guide body rotates when the handle is moved to vary only discharge rate in order also to offer resistance to guide body rotation in the direction which changes the mixing ratio.

DETAILED DESCRIPTION OF THE INVENTION

Figure 1:
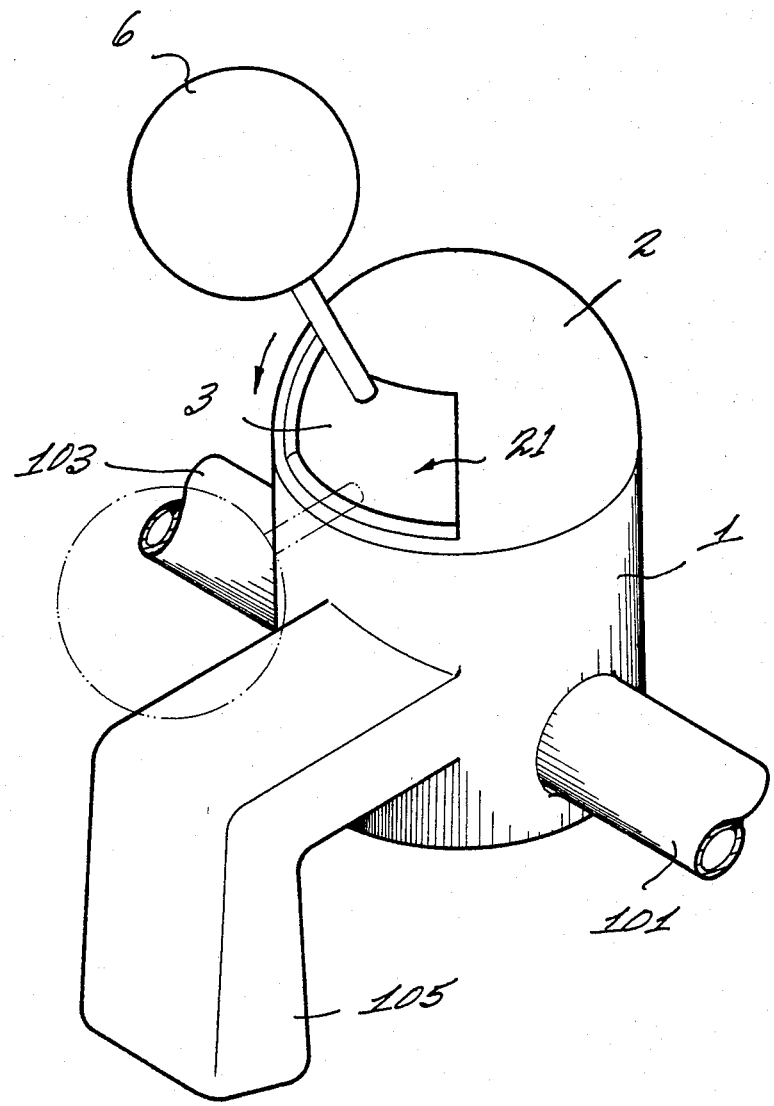
FIG. 1 is a solid outer view of an exemplary embodiment of this invention.

A preferred exemplary embodiment of this invention is adapted to mix hot and cold water together. Referring to FIG. 1, a valve body 1 is connected to a pressurized cold water source 101 and a pressurized hot water source 103. A discharge spout 105 is connected to valve body 1 to discharge a mixture of hot and cold water. A spherical guide body 3 is retained within valve body 1 by a cap 2 shaped in the form of a hollow half-sphere into which is cut a rectangular regulating slot 21. A handle 6, connected to guide body 3, extends from rectangular regulating slot 21 to allow an operator to rotate the guide body. When handle 6 is moved parallel to the horizontal edges of rectangular regulating slot 21, the ratio of hot to cold water flowing from discharge spout 105 will change. When handle 6 is moved parallel to the vertical edges of rectangular regulating slot 21, the rate at which water is discharged from discharge spout 105 will change.

Figure 2:
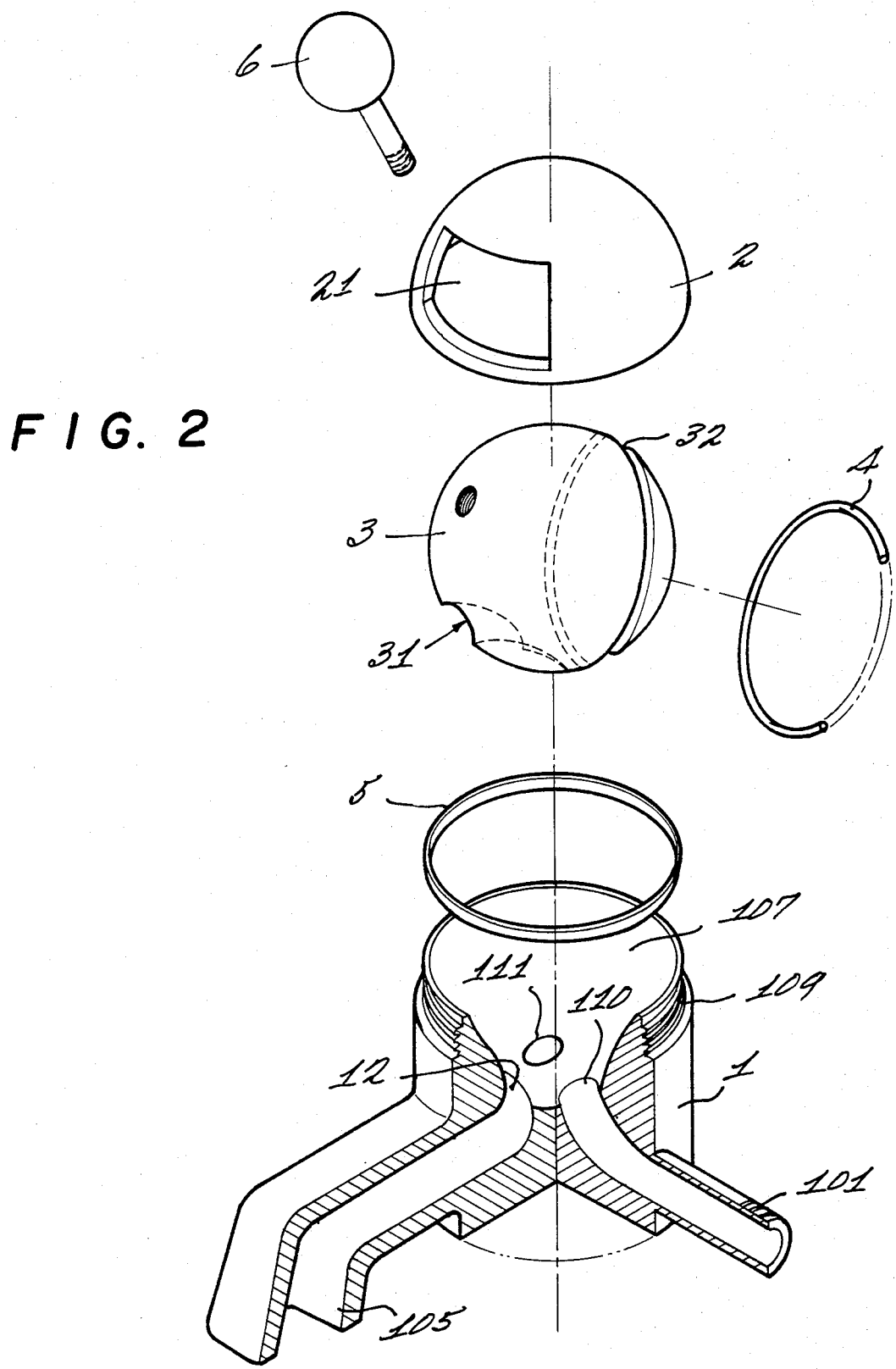
FIG. 2 is an exploded view of an exemplary embodiment of this invention.

Referring to FIG. 2, a half-spherical cavity 107 is disposed in valve body 1. Cold water orifice 110, disposed in cavity 107, connects to cold water source 101. Hot water orifice 111, disposed in cavity 107, connects to hot water source 103 (not shown). Discharge orifice 12, disposed in cavity 107, connects to discharge spout 105. Guide body 3 is rotatably disposed in spherical cavity 107. A mixing cavity 31 is cut into guide body 3. Guide body 3 is retained within cavity 107 by cap 2, which is fastened to valve body 1 by means of threads 109. A resilient washer 5 is placed between valve body 1 and cap 2 to prevent liquid from escaping from cavity 107 into the cap or past threads 109.

Figure 3:
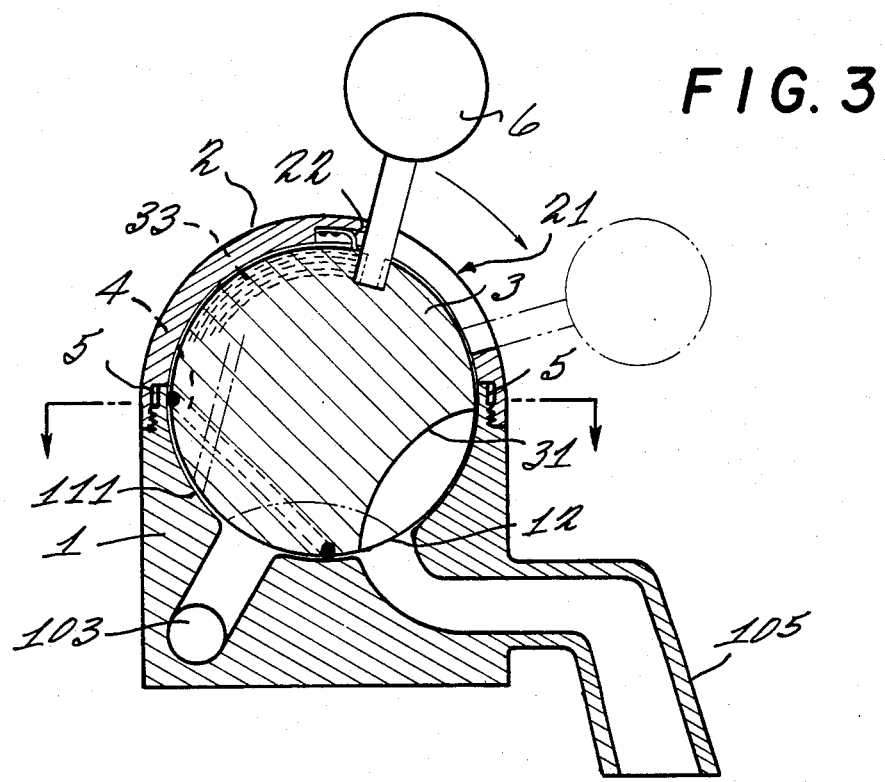
FIG. 3 is a sectional side view of an exemplary embodiment of this invention in a position in which the flow rate of the mixture has been reduced to zero.
Figure 4:
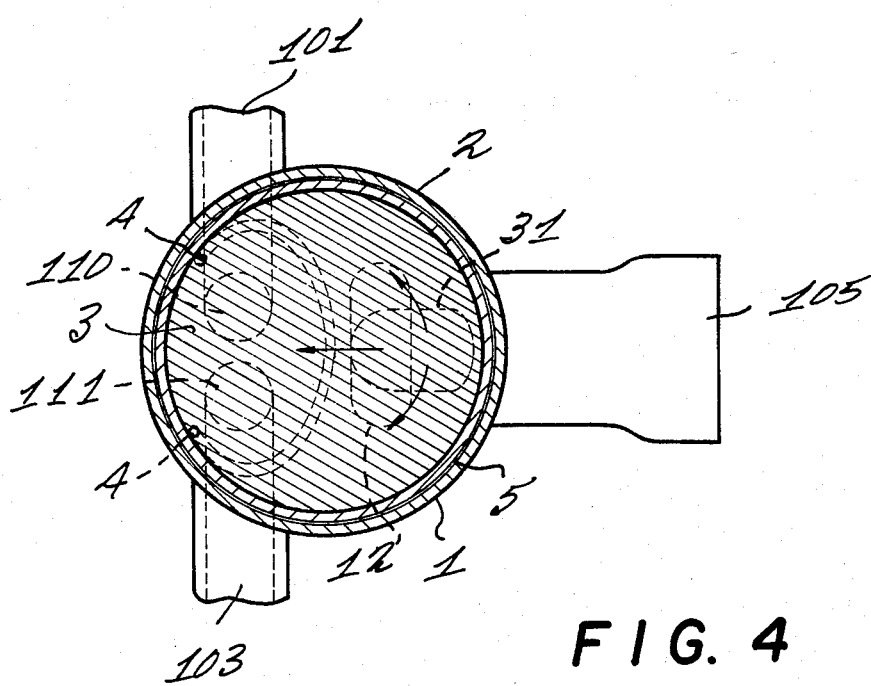
FIG. 4 is a sectional top view of an exemplary embodiment of this invention in a position where the flow rate has been reduced to zero.

A substantially annular slot 32 is cut into guide body 3. A substantially annular seal 4 is disposed in slot 32. Referring to FIGS. 3 and 4, when handle 6 is pushed up to contact the top horizontal edge of rectangular regulating slot 21, seal 4 surrounds cold water orifice 110 and hot water orifice 111, preventing water from escaping from either orifice. No water will be discharged from discharge spout 105 in this position.

Figure 6:
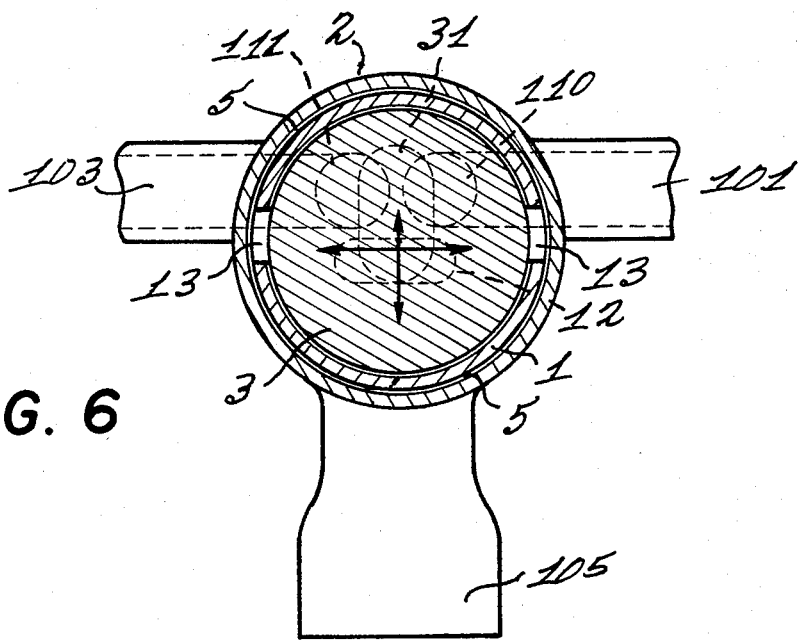
FIG. 6 is a sectional top view of an exemplary embodiment of this invention in a position where the ratio of the first liquid to the second liquid is unity.

Referring to FIG. 6, if handle 6 (not shown) is pulled down away from the top horizontal edge of rectangular regulating slot 21, mixing cavity 31 may simultaneously communicate with cold water orifice 110, hot water orifice 111 and discharge orifice 12. Cold water and hot water will mix together in mixing cavity 31 and flow through discharge orifice 12 to discharge spout 105. If the areas of cold water orifice 110 and hot water orifice 111 which communicate with mixing cavity 31 are changed by moving handle 6 vertically, the total amount of water flowing from discharge spout 105 will change.

Figure 5:
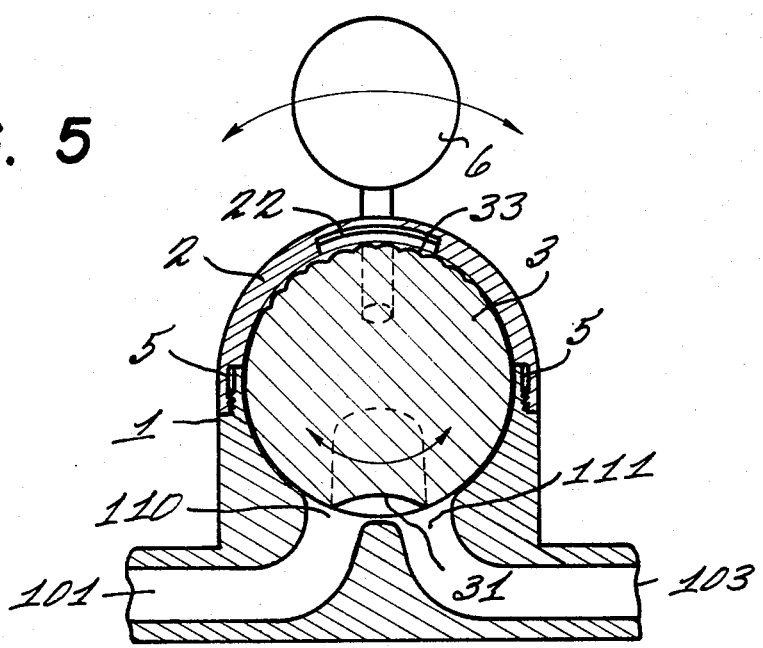
FIG. 5 is a sectional rear view of an exemplary embodiment of this invention.

Referring to FIG. 5, as control handle 6 is moved horizontally, the ratio of the area of cold water orifice 110 communicating with mixing cavity 31 to the area of hot water orifice 111 communicating with the mixing cavity will change, causing the mixture flowing from discharge spout 105 to change in temperature. As control handle 6 is moved toward hot water source 103, the ratio of the area of cold water orifice 110 communicating with mixing cavity 31 to the area of hot water orifice 111 communicating with the mixing cavity will increase, causing the mixture discharged from discharge spout 105 to get colder. As control handle 6 is moved toward cold water source 101, the ratio of the area of hot water orifice 111 communicating with mixing cavity 31 to the area of cold orifice 110 communicating with the mixing cavity will increase, causing the water flowing from discharge spout 105 to get hotter.

Pure vertical motion of control handle 6 will change mixture flow rate but not mixture ratio. Pure horizontal motion of control handle 6 will change mixture ratio, but not mixture flow rate. Control handle 6 is not restricted to pure horizontal or pure vertical motion, but may be moved in a direction containing both vertical and horizontal components. Thus, the temperature and flow rate of the mixture flowing from discharge spout 105 may be changed simultaneously. Moreover, the visual position of control handle 6 indicates the temperature and flow rate of the mixture.

It is often desirable to alter the rate which water flows from discharge spout 105 without changing the temperature of the mixture. Biasing means are used in the preferred exemplary embodiment of the present invention to cause guide body 3 to resist rotation in the direction which will change the ratio of the area of cold water orifice 110 to the area of hot water orifice 111 communicating with mixing cavity 31. Two biasing means are incorporated in the preferred exemplary embodiment.

Referring to FIG. 3, the first biasing means comprises a set of parallel grooves 33 disposed in guide body 3 in the direction in which the guide body rotates when control handle is moved vertically only and without a horizontal component. Grooves 33 are disposed along the upper portion of guide body 3 facing the inner surface of cap 2. A leaf spring 22 fixed to cap 2 extends from the cap to contact grooves 33. If control handle 6 is moved in a purely vertical direction, leaf spring 22 will traverse along the lengths of grooves 33 and offer little resistance to the rotation of guide body 3. However, if control handle 6 is moved in a horizontal direction, leaf spring 22 must trasverse across grooves 33, causing resistance to the rotation of guide body 3. Thus, it is easy to move control handle 6 vertically to affect mixture flow rate, but more force is required to move the control handle horizontally to change mixture temperature.

Referring to FIG. 6, the second biasing means comprises resilient studs 13 disposed between guide body 3 and valve body 1. Studs 13 are placed at the poles defined by the center axis about which guide body 3 rotates when control handle 6 is moved vertically only and without a horizontal component. When control handle 6 is moved vertically to affect mixture flow rate, guide body 3 may rotate about studs 13, and the studs will offer little resistance to rotation. However, if control handle 6 is moved horizontally, studs 13 will offer resistance to the rotation of guide body 3.

Figure 7:
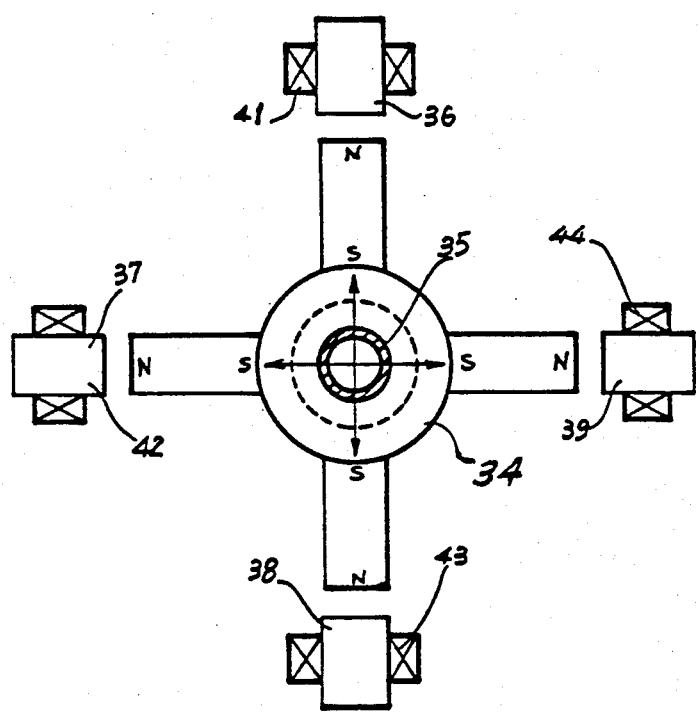
FIG. 7 is a top view of an exemplary embodiment of the present invention controllable by electromagnetic control means.
Figure 8:
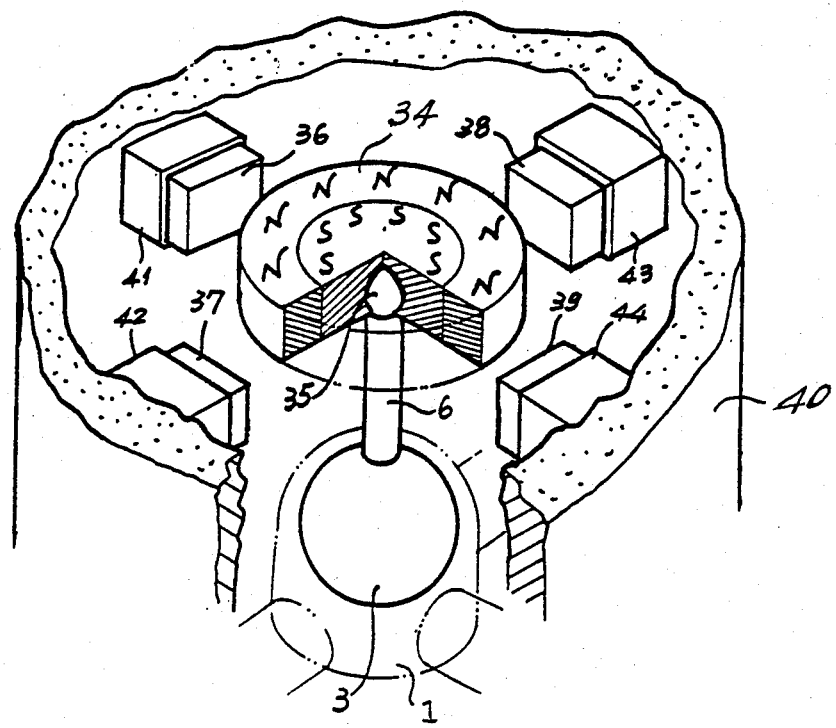
FIG. 8 is a cut-away side view of an exemplary embodiment of the present invention controllable by electromagnetic control means.

In lieu of manual control, electromagnetic or fluid dynamic control means may be used to control the position of control handle 6. Referring to FIGS. 7 and 8, valve body 1 is mounted inside an outer housing 40. An annular permanent magnet 34 is connected to the end of control handle 6 through a universal bearing 35.

Four electromagnets 36, 37, 38 and 39 are fixedly mounted to outer housing 40 90° apart from one another. Each electromagnet 36, 37, 38 and 39 has an excitation winding 41, 42, 43 and 44, respectively. By selectively applying direct current to one or more excitation windings 41, 42, 43, and 44, electromagnets 36, 37, 38 and 39 will attract permanent magnet 34 and pull the permanent magnet into an equilibrium position. The motion of permanent magnet 34 will cause the position of control handle 6 to change. Thus, the mixture composition and mixture discharge rate may be controlled by controlling the presence and magnitude of direct current applied to excitation windings 41, 42, 43 and 44.

Figure 9:
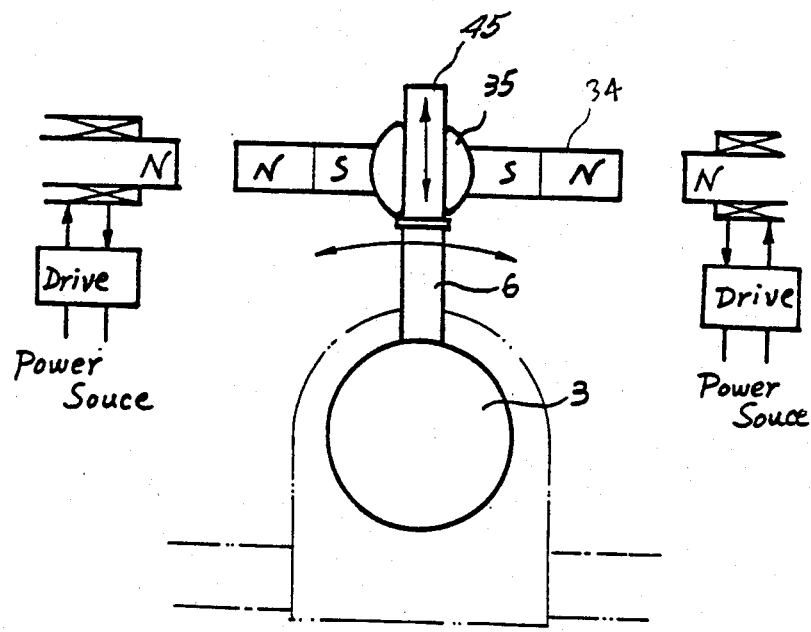
FIG. 9 is a side view of an exemplary embodiment of the present invention controllable by electromagnetic means and equipped with an axially-sliding bushing.

Referring to FIG. 9, an axially-sliding bushing 45 is used to connect control handle 6 to universal bearing 35. Bushing 45 allows permanent magnet 34 to remain in the same plane as electromagnets 36, 37, 38 and 39 regardless of the position of control handle 6.

While the invention has been described in connection with what is presently considered to be the most practical and preferred embodiments, it is to be understood that the invention is not to be limited to the disclosed embodiments but on the contrary, is intended to cover various modifications and equivalent arrangements included within the spirit and scope of the appended claims which scope is to be accorded the broadest interpretation so as to encompass all such modification and equivalent structures.

I claim:

1. A valve for mixing a first liquid with a second liquid, comprising:
   a valve body having a wall shaped so as to define a spherical cavity within said valve body;
   said wall having a first orifice therethrough for injecting said first liquid into said cavity;
   said wall also having a second orifice therethrough for injecting said second liquid into said cavity, said first and second liquids mixing in said cavity to form a mixture thereof;
   said wall also having a third orifice therethrough for discharging said mixture from said cavity;
   a spherical guide body rotatably disposed in said spherical cavity, said guide body being formed so as to have a mixing cavity therein and communicating with a variable portion of the areas of said first, second and third orifices as said guide body rotates; and
   a handle, connected to said guide body, movable anywhere in a rectangular portion of a plane, the motion of said handle having first and second components at right angles to one another, motion in the direction of said first component rotating said guide body to vary a mixture ratio by varying a ratio of the area of said first orifice communicating with said mixing cavity to the area of said second orifice communicating with said mixing cavity, and motion in the direction of said second component rotating said guide body to change a mixture discharge rate by multiplying the area of said first orifice communicating with said mixing cavity and the area of said second orifice communicating with said mixing cavity by the same constant,
   wherein said guide body also has a substantially annular slot therein and further comprising a substantially annular seal disposed in said slot and positioned to prevent fluid from escaping from said first orifice and said second orifice when said handle is moved into an extreme position in the direction of said second component.

2. A valve for mixing a first liquid with a second liquid, comprising:

a valve body having a wall shaped so as to define a spherical cavity within said valve body;

said wall having a first orifice therethrough for injecting said first liquid into said cavity;

said wall also having a second orifice therethrough for injecting said second liquid into said cavity, said first and second liquids mixing in said cavity to form a mixture thereof;

said wall also having a third orifice therethrough for discharging said mixture from said cavity;

a spherical guide body rotatably disposed in said spherical cavity, said guide body being formed so as to have a mixing cavity therein and communicating with a variable portion of the areas said first, second and third orifices as said guide body rotates;

said guide body also having a substantially annular slot therein; and a substantially annular seal disposed in said slot for selectively enclosing said first and second orifices to prevent fluid from escaping from said first orifice and said second orifice.

3. A valve for mixing as in claim 2 further comprising:

a handle, connected to said guide body, movable anywhere in a rectangular portion of a plane, the motion of said handle having first and second components at right angles to one another, motion in the direction of said first component rotating said guide body to vary a mixture ratio by varying a ratio of the area of said first orifice communicating with said mixing cavity to the area of said second orifice communicating with said mixing cavity, and motion in the direction of said second component rotating said guide body to change a mixture discharge rate by multiplying the area of said first orifice communicating with said mixing cavity and the area of said second orifice communicating with said mixing cavity by the same constant.

4. A valve for mixing a first liquid with a second liquid, comprising:

a valve body having a wall shaped so as to define a spherical cavity within said valve body;

said wall having a first orifice therethrough for injecting said first liquid into said cavity;

said wall also having a second orifice therethrough for injecting said second liquid into said cavity, said first and second liquids mixing in said cavity to form a mixture thereof;

said wall also having a third orifice therethrough for discharging said mixture from said cavity;

a spherical guide body rotatably disposed in said spherical cavity, said guide body being formed so as to have a mixing cavity therein and communicating with a variable portion of the areas of said first, second and third orifices as said guide body rotates;

a handle, connected to said guide body, movable anywhere in a rectangular portion of a plane, the motion of said handle having first and second components at right angles to one another, motion in the direction of said first component rotating said guide body to vary a mixture ratio by varying a ratio of the area of said first orifice communicating with said mixing cavity to the area of said second orifice communicating with said mixing cavity, and motion in the direction of said second component rotating said guide body to change a mixture discharge rate by multiplying the area of said first orifice communicating with said mixing cavity and the area of said second orifice communicating with said mixing cavity by the same constant; and biasing means for resisting movement of said handle in the direction of said second component but not in the direction of said first component to allow easy adjustment of the rate of mixture discharge without change in the mixture ratio of said first liquid to said second liquid.

5. A valve for mixing as in claim 4 wherein said biasing means comprises:

a plurality of parallel grooves disposed in said guide body along the direction in which said guide body rotates when said handle is moved in a direction having said second component of motion only; and a leaf spring extending from said spherical cavity to contact said grooves.

6. A valve for mixing as in claim 4 wherein said biasing means comprises two resilient studs disposed between said guide body and said spherical cavity, one placed at each of the poles defined by the center axis of said guide body about which said guide body rotates when said handle is moved in a direction having only said second component.

7. A valve for mixing as in claim 5 wherein said biasing means further comprises two resilient studs disposed between said guide body and said spherical cavity, one placed at each of the poles defined by the center axis of said guide body about which said guide body rotates when said handle is moved in a direction having only said second component.

8. A valve for mixing as in claim 1 further comprising biasing means for resisting movement of said handle in the direction of said second component but not in the direction of said first component to allow easy adjustment of the rate of mixture discharge without change in the mixture ratio of said first liquid to said second liquid.

9. A valve for mixing as in claim 8 wherein said biasing means comprises:

a plurality of parallel grooves disposed in said guide body along the direction in which said guide body rotates when said handle is moved in a direction having said second component of motion only; and a leaf spring extending from said spherical cavity to contact said grooves.

10. A valve for mixing as in claim 8 wherein said biasing means comprises two resilient studs disposed between said guide body and said spherical cavity, one placed at each of the poles defined by the center axis of said guide body about which said guide body rotates when said handle is moved in a direction having only said second component.

11. A valve for mixing as in claim 9 wherein said biasing means further comprises two resilient studs disposed between said guide body and said spherical cavity, one placed at each of the poles defined by the center axis of said guide body about which said guide body rotates when said handle is moved in a direction having only said second component.

* * * * *